(12) United States Patent
Fuller et al.

(10) Patent No.: US 11,600,995 B2
(45) Date of Patent: Mar. 7, 2023

(54) PEAK POWER SPREADING

(71) Applicant: WET, Sun Valley, CA (US)

(72) Inventors: Mark W. Fuller, Sun Valley, CA (US);
Maria Villamil, Sun Valley, CA (US);
John Canavan, Sun Valley, CA (US)

(73) Assignee: WET, Sun Valley, CA (US)

( * ) Notice: Subject to any disclaimer, the term of this patent is extended or adjusted under 35 U.S.C. 154(b) by 0 days.

(21) Appl. No.: 16/027,212

(22) Filed: Jul. 3, 2018

(65) Prior Publication Data
US 2019/0013688 A1 Jan. 10, 2019

Related U.S. Application Data

(60) Provisional application No. 62/529,427, filed on Jul. 6, 2017.

(51) Int. Cl.
| | |
|---|---|
| *H02J 7/00* | (2006.01) |
| *B05B 17/08* | (2006.01) |
| *H02J 3/32* | (2006.01) |
| *G05B 19/042* | (2006.01) |
| *H02J 7/34* | (2006.01) |
| *G09F 19/00* | (2006.01) |

(52) U.S. Cl.
CPC ............... *H02J 3/32* (2013.01); *B05B 17/08* (2013.01); *G05B 19/042* (2013.01); *H02J 7/0068* (2013.01); *G05B 2219/2639* (2013.01); *G09F 19/00* (2013.01); *H02J 7/345* (2013.01)

(58) Field of Classification Search
CPC ........ G05B 19/042; H02J 7/00; H02J 7/0068; H02J 7/345; H02J 3/003; B05B 17/08; G09F 19/00

USPC ....... 307/19, 17, 9.1, 10.1, 66, 64, 104, 108, 307/149; 320/108
See application file for complete search history.

(56) References Cited

U.S. PATENT DOCUMENTS

| | | | |
|---|---|---|---|
| 9,453,635 B1* | 9/2016 | Fuller | F21V 23/005 |
| 2003/0061828 A1 | 4/2003 | Blevins | |
| 2006/0092588 A1 | 5/2006 | Realmuto et al. | |
| 2009/0250528 A1* | 10/2009 | Schnuckle | B05B 17/08 |
| | | | 239/18 |
| 2011/0121654 A1* | 5/2011 | Recker | H02J 7/34 |
| | | | 307/66 |
| 2012/0262093 A1* | 10/2012 | Recker | H02J 7/0068 |
| | | | 315/308 |
| 2013/0134891 A1* | 5/2013 | Woytowitz | H05B 47/175 |
| | | | 315/201 |
| 2014/0097758 A1* | 4/2014 | Recker | H02J 9/065 |
| | | | 315/297 |
| 2014/0354047 A1 | 12/2014 | Markhovsky et al. | |
| 2015/0203328 A1 | 7/2015 | Horbrugger et al. | |
| 2015/0318812 A1* | 11/2015 | O'Donnell | H02P 5/747 |
| | | | 310/78 |
| 2016/0294205 A1 | 10/2016 | Zimnicki et al. | |
| 2017/0097667 A1* | 4/2017 | Ramamurthy | G06F 1/28 |

(Continued)

*Primary Examiner* — Hal Kaplan
*Assistant Examiner* — Swarna N Chowdhuri
(74) *Attorney, Agent, or Firm* — Maceiko IP

(57) ABSTRACT

A system including a battery system to provide additional power during peak operating conditions is described. The system may avoid or reduce the need for extensive infrastructure associated with a power delivery system capable of providing peak power, but may instead, rely on infrastructure that need only provide power needed on an average basis.

20 Claims, 3 Drawing Sheets

(56) References Cited

U.S. PATENT DOCUMENTS

2019/0060944 A1* 2/2019 Fuller .................... F21S 8/032
2021/0156926 A1* 5/2021 Knudson ............... G06F 1/3212

* cited by examiner

PEAK POWER SPREADING

CROSS-REFERENCE TO RELATED APPLICATION

This application claims the benefit of U.S. Provisional Application No. 62/529,427, filed Jul. 6, 2017, the contents of which are incorporated hereby reference.

FIELD OF THE INVENTION

The current invention generally relates to providing power to a system, such as a water display, at peak and non-peak conditions. The current invention also relates to the use of power storage assemblies for the water display to provide additional power during peak power conditions such that the power supply infrastructure may be sized for the average use of power and not the peak power usage.

BACKGROUND OF THE INVENTION

Water and lighting displays are generally peak driven in their usage of energy. The energy required to propel water through jets into displays is typically used, at most during a 16 hour period, out of a 24 hour day when viewers are watching. Even during those 16 hours, however, the fountain shows typically run for 4 or 5 minutes once, twice or perhaps four times per hour. And on a finer scale, even during those fountain shows, the energy usage varies depending upon how many jets or lights are operating at any given moment within the show (perhaps all at a climactic moment, very few at the start and some varying number in between).

The energy usage for the lighting aspect of the display is generally even more peak-affected because of the 16 nominal hours of display operation in any given day, only about 6 of those hours are after dark with the lights operating in conjunction with the water displays.

Building codes associated with water and lighting displays typically require that the electrical services be sized to the maximum connected loads that may draw from them. This is reasonable, because the transformers, power cables, switches, combiners, dividers, breakers and fuses, and other components must be able to support the occasional big moment when everything is turned on, however briefly.

The average electrical draw may be only a small percentage of this momentary surge. In fact, the peak is often twenty five to fifty times greater than the mean usage. However, the construction cost for the infrastructure to supply peak power levels to support the occasional big movement is significant—on a large fountain mounting into the tens of millions of dollars. And, if additional electricity consuming elements are desired to be added later to a fountain, it is often a practical impossibility to add the additionally required infrastructure to a finished installation.

Peak demand charges from utility companies are also typically a very large component of the power usage charge each month, and the peak power draws can adversely affect the billing rates for much of the overall usage.

This issue has been partially addressed in the past with water display systems that replaced electrical pumps (in the devices where this was possible) with compressed air storage tanks that would release the air in a way that propelled water through the associated jets. Jets powered in this way are referred to as SHOOTER® water delivery systems as provided by WET. These systems were comprised of air compressors that were sized to the mean (rather than the peak) load of the combined SHOOTER® systems in the display. By way of example, the mean load for a pulsed water jet is typically less than 20% of the peak load. The air itself, by means of compression, stores the energy that may then be released when the air decompresses. There is a bank of large storage vessels near the compressor station, and then in some cases, smaller individual air tanks by the individual devices in the fountain which together store the energy produced over time by the compressors and release it on demand at the peaks.

However, not all water jets powered by electrical pumps can be replaced by jets powered by compressed air, since the compressed air jets are pulsed and cannot supply a continuous flow of water for displays that so require. Accordingly, there is a need for a system that addresses this problem for electrically powered water display elements and that provides the peak energy for lights and electrically pumped water jets.

SUMMARY OF THE INVENTION

The current invention is based on the concept of using batteries or other electrical current storage devices, e.g., capacitors, herein referred to as "battery banks" or "power banks" to average electrical demand for lighting and for the type of water jets that do not lend themselves to compressed air operation in a way similar to the compressed air concept. This allows the incoming power feed system to be sized to the average daily energy consumption, not the peak. This, in turn, decreases the infrastructure's initial cost and the on-going operational electrical usage costs.

In a first aspect of the invention, a water display is described that receives power from a main power source, such as a utility grid, power plant, solar sources or power generator, during times of average power consumption, and additional power from a battery bank during times of peak power consumption. The water display may generally receive power from the main power source during moments of the water display performance where the power consumption is below a defined threshold and where the power consumption is not at peak demand. However, during moments of the water display performance that require power consumption that is above this threshold, the water display may also receive additional power from the battery or power bank.

In another aspect of the invention, the battery bank may be charged at the time of day or night when the energy costs are lowest (or from solar) and then the water display may be operated fully from this stored energy.

In another aspect of the invention, the water display may include predictive software that may determine when the water display may require additional power. For example, the software may evaluate the choreography of the water and/or lighting elements of the display to determine in advance when more power may be necessary, and then provide the power necessary to effect the choreography. In this aspect, the current invention may also include the hardware necessary to provide the additional power to the display.

In another aspect of the invention, the water display may include a number of localized smaller battery bank assemblies and power delivery assemblies that may be configured in close physical proximity to the various elements of the water display that require the additional power during the water display performance. Such small local storage units (e.g., battery, capacitor or other electrical current storage device) may supply very short peak demands locally to one or a small group of devices, thereby obviating the need to draw power from a central battery bank. By way of example, each light fixture may contain a rechargeable battery or capacitor. Such a hybrid between a central battery bank and local current storage reduces the wiring sizes to the individual display devices, and hence reduces cost. The scope of this invention also encompasses inclusion of software to effect this optimization, both at the time of the system engineering for optimal construction costs and during display operation for optimal usage costs.

Other aspects of the invention are discussed herein.

DETAILED DESCRIPTION OF THE PREFERRED EMBODIMENTS

Figure 1:
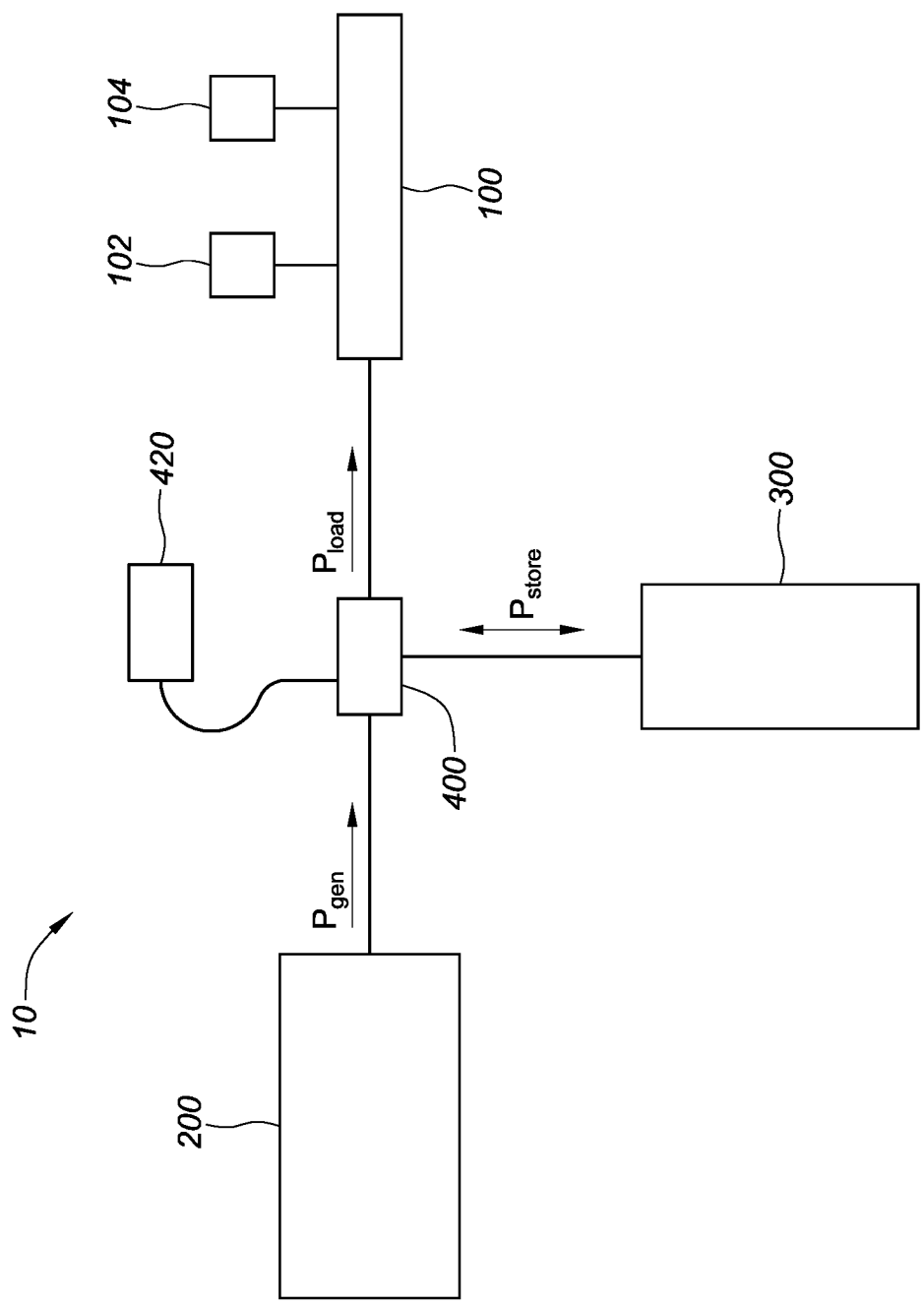
FIG. 1 is a schematic of a water display with power supply assemblies.

The display 10 of the current invention along with its various power delivery assemblies are now described with reference to the figures. Where the same or similar components appear in more than one figure, they are identified by the same or similar reference numerals. The invention is described herein with reference to a display containing water. However, other liquids and combinations thereof are within the scope of the invention.

In general, display 10 may include a variety of water display elements such as water jets and SHOOTER® systems, lighting elements, fog or misting elements, motion control or robotic jets, mobile jets or lighting (as in a boat that is part of the display) and other types of elements and components that may all require power to operate. The electrical demand for such a water display 10 may be determined by the formula:

$$D=N*P*T*M*S*(H/24)$$

Where:

D=average electrical demand in watts per hour over a 24 hour day

N=number of devices

P=maximum electrical demand of each device (in watts)

T=average power used per show (this may be based on the show program or a simple percentage may be used)

L=the length of the show in minutes

M=L/60=the fraction of each hour in which the fountain operates

S=number of shows per hour while the fountain is playing

H=hours of operation in a 24 hour day

One such water display is described in U.S. Pat. No. 9,253,840 which is incorporated by reference as if fully set forth herein.

A sample calculation for the lighting load of a fountain which operates from 10:00 a.m. to midnight, with 5 minute shows playing three times per hour, and the lights (5,000 of them at 600 watts each) operating from 6:00 p.m. to midnight, would be as follows:

D=5,000 lights per show×600 watts per light×6 hours/day×5/60 hour×3 shows per hour at 20% of full load average per show=37.5 kilowatt hours of energy per 24 hour day.

However, it can be seen that the peak lighting demand is 5,000×600=3,000,000 watts=3.0 Mw.

Thus, the peak demand of the water display 10 (possibly during a moment in the show where all of the display elements are active and drawing full power) is much larger than the average power demand over the duration of a day. And as described above, the electrical infrastructure required to sustain this peak power, even if just for a short duration, compared to the infrastructure required for and average power demand is significantly more robust, comprehensive and expensive.

As described in more detail below with regards to the current invention, this problem is addressed by designing a system where the power supplied to the various water display elements may come from several different sources in order to optimize the delivery of the power depending on the required power load and consumption at any particular moment in time. This may include power delivered by a main or central battery bank and/or localized power storage units.

Turning now to FIG. 1, a preferred embodiment may include a water display assembly 100 that may include water jets or water delivery devices 102, lighting elements 104 and other types of display elements that may provide dramatic effect of the display. Water jets 102 and lighting elements 104 may require the delivery of power from an outside source. Power may be provided by a main power assembly 200 that may include a power plant, a power generator or other source of power connected to the display assembly 100 through a local power grid or other types of transmission infrastructure. In addition, water display assembly 100 may receive additional power from battery bank 300 when necessary. In this scenario, when water display assembly 100 may require additional power, such as at peak operating conditions at the climactic portion of a performance, battery power delivery assembly 400 may deliver additional power from battery bank 300 to water display assembly 100. This will be described in further detail below.

As described in the above section, water display assembly 100 may require peak power levels during certain moments of the display choreography, such as when all of the water jets 102 and lights 104 are active and employed simultaneously during a climax of a show. However, system 100 may require much lower power levels during moments when a smaller fraction of the water jets 102 and lights 104 are active. In fact, the climactic moments of the show that may require peak power may only represent a very small fraction of the total time span of the show such that during most of the show a much smaller amount of power may be actually required.

Figure 2:
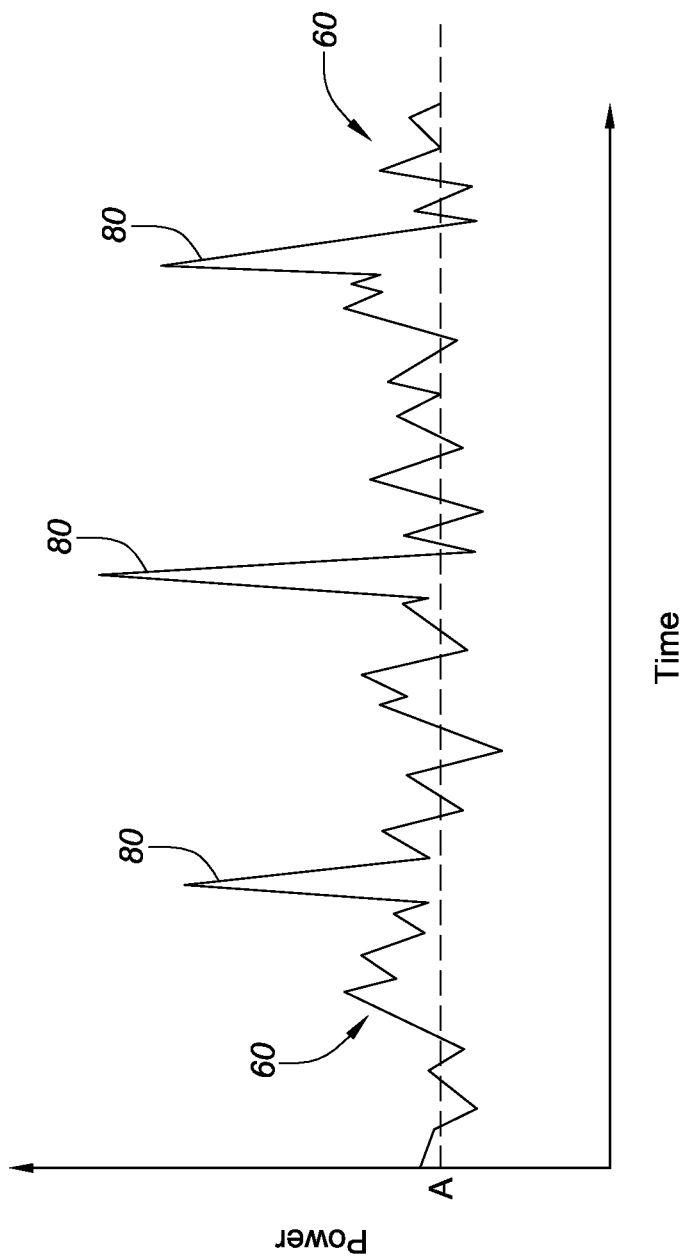
FIG. 2 is a chart of power consumption by a water display.

This is depicted by the graph of FIG. 2 that plots the power consumption of the water display assembly 100 on the vertical axis vs. time on the horizontal axis. As shown, valleys or other low-power consumption times 60 may represent the majority of moments during the water display performance that may require less amount of power, while peak 80 may represent a moment during the water display show that may require a peak power spike. It should be noted that the amplitude and duration of peaks 80 and valleys 60 may vary, and are not limited to those shown in FIG. 2. (The power required may be even lower for the times between performances.)

Referring back to FIG. 1, the arrows represent energy flow. For instance, $P_{gen}$ may represent power flowing out of the main power assembly 200 to display 10. In addition, $P_{store}$ may represent power that may flow out of battery bank 300 to display 10, at selected times during a performance. $P_{store}$ may also represent power that may flow into battery bank 300 that may be used to recharge the battery bank 300. This may occur between performances, at times of day or night when the energy costs are lowest or during other non-peak conditions. This is denoted by the double headed arrow depicting $P_{store}$. It is widely known that energy costs from local or regional energy providers may fluctuate throughout the day depending on the demand for the energy. For instance, during the middle of the afternoon when it may be hot and a high proportion of local homes and businesses may be using air conditioners, energy usage may be high and the cost of energy during these times may rise. However, during other times of the day, such as early morning when the temperature outside may be cooler, energy usage may be low resulting in a lower cost of energy during these times. In this example, the low energy costs may be approximately half of the cost of energy when the demand is high. And because the energy suppliers may adjust the cost of energy throughout the day, it may be preferable to choose a time when energy costs are low to recharge battery bank 300 with $P_{store}$ flowing into battery bank 300.

$P_{load}$ may represent the power that may flow into water display assembly 100 to power the various water jets 102, lighting elements 104 and other water display elements at any given moment in time. It can be seen that $P_{load}$ as it flows out of battery power delivery system 400 may be a combination of $P_{gen}$ and $P_{stored}$.

Referring now to FIG. 1 and FIG. 2, an example of the general operation of the current invention is now described. It is an objective of the current invention to limit the amount of power required of the main power assembly 200, for example, to generally require the lower or average power consumption of water display assembly 100, during its non-peak or off-climax moments. In this example, the power consumption threshold is represented by the power consumption threshold line A in FIG. 2. That is, power consumption by water display assembly 100 that is depicted below line A is provided by main power assembly 200, and power consumption by water display assembly 100 that is depicted above line A is provided by battery bank 300.

Given this, it can be seen that for moments in time when the power consumption is below line A in FIG. 2, $P_{load}$ may consist generally of $P_{gen}$, and $P_{stored}$ may consist of a component of $P_{gen}$ that may flow or be diverted into battery bank 300 as necessary to charge the battery bank 300. However, for moments when the power consumption is above line A, for instance during spike 80, $P_{load}$ may consist of $P_{gen}$ plus $P_{stored}$ (with $P_{stored}$ flowing out of battery bank 300) such that the higher power required during the peak may be provided by the additional $P_{stored}$ component.

In this scenario, main power assembly 200 may only be required to provide electrical services that are sized to power consumption that may be below power threshold line A, and may not be required to support power consumption above this power level. Accordingly, the various transformers, power cables, transmission lines, switches, power breakers, combiners, dividers, fuses, circuits, relays and other infrastructure components that may be required for main power assembly 200 to delivery power to display 10, may only be required to support power consumption below threshold line A and not above it. This may greatly reduce the power infrastructure cost of the display 10. This may also facilitate the permitting process under local laws that may be required for construction.

Battery power delivery assembly 400 may comprise hardware and software that may intelligently provide power from battery bank 300 to water display assembly 100 when the additional power is required. As such, battery power delivery assembly 400 may combine $P_{gen}$ from main power assembly 200 with $P_{stored}$ from battery bank 300 to deliver the higher power required, and may include power combiners, couplers, switches, transformers, and other components and circuitry that may be required to combine the powers and delivery them to water display assembly 100.

In addition, battery power delivery assembly 400 may include predictive software that may track the power consumption needs of water display assembly 100, and predict when the assembly 100 may require additional power. The predictive software may utilize information regarding the choreography of the water display such that it may know when higher numbers of water display elements may be employed during the show, when elements that demand higher amounts of power may be employed, and other information that may allow it to predict the need for additional power.

The predictive software may also track and utilize trends in power consumption in order to predict future moments when additional power may be required. And when the additional power is required, the predictive software may control the hardware of battery power delivery assembly 400 to provide the necessary power. The predictive software may also predict when the additional power may no longer be required and may instruct the hardware to stop, reduce or provide the power accordingly.

The predictive software may reside directly within battery power delivery assembly 400, or it may reside on controller 420 that may be configured to control battery power delivery assembly 400 as well as other components of display 10 including the water jets 102, lighting elements 104 and other elements of water display assembly 100.

During times when the power consumption of water display assembly 100 is below the threshold power level, battery power delivery assembly 400 may direct a component of $P_{gen}$ from main power assembly 200 into battery bank 300 in order to charge the battery bank 300. This is depicted as $P_{store}$ flowing into the battery bank 300. In this way, battery bank 300 may remain adequately charged such that when additional power is required it may have sufficient power to provide.

Accordingly, if the power from main power assembly 200 utilizes alternating current (AC), battery power delivery assembly 400 may include rectifiers or other types of circuitry that may convert the AC to direct current (DC) that may be required by battery bank 300. In addition, if water display assembly 100 requires AC, battery power delivery assembly 400 may also include inverters or other types of circuitry to convert the direct current (DC) that may flow out of the battery bank 300 (during moments that water display assembly 100 may require additional power) to AC so that it can be delivered to water display assembly 100.

If components of the water display assembly 100 require DC, then battery power delivery may convert the AC from main power assembly 200 to DC as necessary. This conversion may also be performed by main power assembly 200.

Water display assembly may also include components that may require AC and other components that may require DC. In this configuration, a combination of AC and DC may be provided by main power assembly 200 and/or battery bank 300 through battery power delivery assembly 400, or from other power sources through other delivery assemblies.

Battery bank 300 which is now further described, may comprise a single battery unit that may provide any required additional power to water display assembly 100 as described above. In addition, battery bank 300 may comprise a number of battery banks that may include multiple battery units, or battery packs, that when configured together, make up battery bank 300. These batteries may include Nickel Cadmium (NiCd) batteries, Nickel-Metal Hydride (NiMH) batteries, Lead Acid batteries, Lithium Ion batteries, Lithium Polymer batteries or other types or combination of batteries. Battery banks 300 may also include capacitors or other types of electrical current storage devices.

In addition, these battery packs may be configured with each other in series or in parallel, or in a combination of series and in parallel. Also, while FIG. 1 depicts battery bank 300 as a single unit located in a single physical position, battery bank 300 may alternatively comprise a number of individual battery banks, units, assemblies or packs that may be distributed throughout water display assembly 100.

Figure 3:
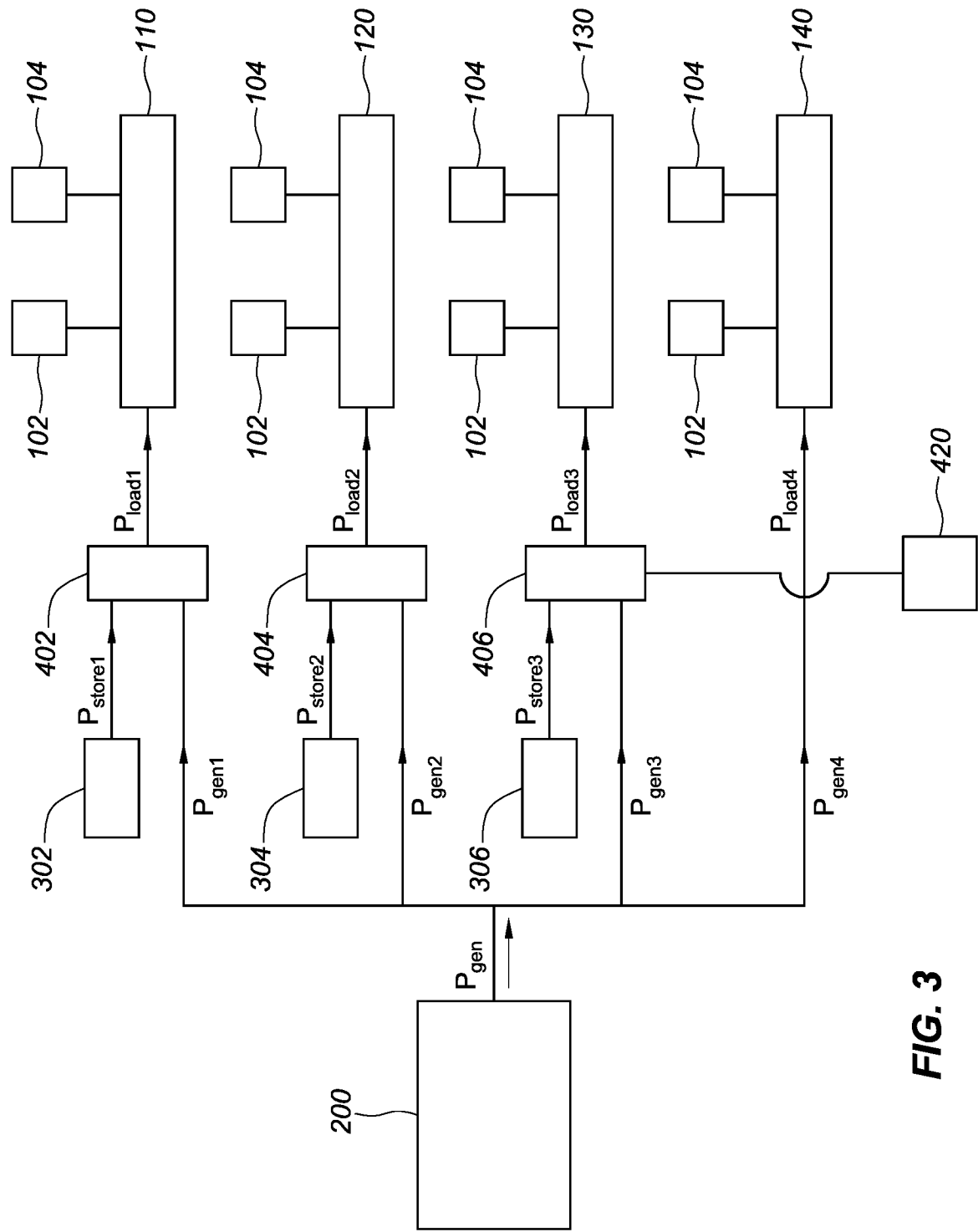
FIG. 3 is a schematic of a water display with display subassemblies with associated power supply assemblies.

In one example, as depicted in FIG. 3, water display assembly 100 may comprise of water display subassembly 110, water display subassembly 120 and water display subassembly 130, with each subassembly 110, 120, 130 including water display elements such as water delivery devices 102, lighting elements 104 and other types of display elements. In this scenario, each water display subassembly 110, 120, 130 may include a battery bank and a battery power delivery assembly to inject power from the respective battery bank to the respective water display subassembly. For instance, water display subassembly 110 may include battery bank 302 and battery power delivery assembly 402 as shown. Note that battery bank 302 may be smaller in size and power delivery capacity than other larger battery banks 300 described above. However, this may not be required.

For water display subassembly 100, main power assembly 200 may provide $P_{gen1}$ to battery power delivery assembly 402, and battery bank 302 may provide $P_{store1}$ to power delivery assembly 402 as depicted. When water display subassembly 110 does not require additional power, battery power delivery assembly 402 may pass $P_{gen1}$ to water display subassembly 110 as $P_{load1}$ without injecting $P_{store1}$ from battery bank 302.

However, in moments during the water display performance when water display subassembly 110 may require additional power above $P_{gen1}$, battery power delivery assembly 402 may inject $P_{store1}$ from battery bank 302 to add to $P_{gen1}$ such that the $P_{load1}$ now delivered to water display subassembly 110 may include the additional power $P_{store1}$ that it may require during its peak power consumption.

The same general flow may exist for water display subassemblies 120, 130 with battery banks 304, 306 delivering $P_{store2}$ and $P_{store3}$ respectively, and battery power delivery assemblies 404, 406 delivering $P_{load2}$ and $P_{load3}$ respectively.

With smaller local battery banks 302, 304, 306 supplying short peak power demands locally to one or a small group of elements 102, 104, the need to draw power from a central battery bank 300 may be obviated or reduced. As described above and shown in FIG. 3, each water display subassembly 110, 120, 130 may include local battery banks 302, 304, 306 respectively and may therefore have less of a requirement to draw power from a centrally located battery bank 300. As such, the electrical wiring that may delivery power to elements 102, 104 in water display subassemblies 110, 120, 130, may be reduced in size with a direct result in the reduction in cost. The scope of this invention also encompasses inclusion of software to effect this optimization, both at the time of the system engineering for optimal construction costs and during display operation for optimal usage costs.

FIG. 3 also depicts water display subassembly 140 that need not include a dedicated battery bank or a battery power delivery assembly such that $P_{load4}$ may equal $P_{gen4}$. In this case, it may have been determined that the water display elements 102, 104 may not require additional power during the performance of the water display choreography such that the additional battery power infrastructure may not be required.

While FIG. 3 depicts three water display subassemblies 110, 120, 130 that may include battery banks 302, 304, 306 and battery power delivery assemblies 402, 404, 406, and one water display subassembly 140 that does not include these assemblies, any number of water display subassemblies that may or may not include the additional battery banks and/or battery power delivery assemblies may be included within display 10. In sum, display 10 may include local battery power assemblies and battery power delivery assemblies wherever display 10 has display elements that may need increased power.

In addition, while FIG. 3 depicts the various water display subassemblies 110, 120, 130, 140 being powered in parallel, they may also be powered in series, or in any combination of parallel and series. In addition, the power delivery architecture depicted in FIG. 1 may be combined with the power delivery architecture depicted in FIG. 3. All of the other characteristics and operational functionalities described above with regard to battery bank 300 in FIG. 2 may also apply to the configurations described here with regard to FIG. 3.

Another benefit of having localized battery banks dedicated to particular water display subassemblies may be that the battery banks may be physically located in close proximity (for example, within ten feet or at least less than twenty feet) to the water elements that they may be supplying power to. This may reduce the amount of power lost during transmission through power lines and cables and may therefore improve the overall efficiency of the power transfer. In some cases it may be preferable for the battery banks to be located within several feet of the display elements they may be powering in order to minimize these transmission losses. This modularity approach may also allow for easier maintenance of each water display subassembly and its associated battery power and delivery assemblies.

In addition, it should be noted that the battery banks, the battery power delivery assemblies and any other components required by the water display 10 may be housed in water proof or water resistance housings or casings in order to avoid water damage. Also, the predictive software that may predict when the additional power may or may not be required by battery banks 302, 304, 306 may reside directly within battery power delivery assemblies 402, 404, 406 or it may reside on controller 420 that may be configured to control battery power delivery assembly 402, 404, 406 as well as other components of display 10 including the water jets 102, lighting elements 104 and other elements of water display subassemblies 110, 120, 130.

As noted earlier, certain water delivery devices may employ compressed air to provide the force to emit water in a pulsed fashion. In this manner, the compressed air provides the increased "power" to emit water during climactic portions of a show. However, this compressed air configuration may not effectively supply "power" to emit water where it is desired to emit water for an extended or continuous period. To address this need, the current invention may provide increased power from the appropriate battery banks, e.g., central and/or local, for the desired duration.

The current invention may also be retrofitted to existing water and lighting displays. To this end, the power infrastructure of an existing display may be replaced or supplemented by the peak power spreading system of the current invention. For example, where the infrastructure of an existing display has become worn or needs fixing, the relevant parts of that infrastructure may be replaced with the current invention. This may involve replacement with a primary battery bank or localized banks. As another example, where it is desired to enhance an existing system by increasing the magnitude of the water and/or lighting elements during climactic parts of a performance, the system of the current invention may be used to replace or supplement the existing infrastructure. As indicated above, the preferably lowers utility bills and decreases the size and magnitude of infrastructure.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A water and/or light display that provides a performance, wherein the performance has a power consumption threshold that is exceeded during the performance, the display, comprising:
   at least one water delivery device and/or at least one lighting element requiring power;
   a main source of power;
   an alternative source of power;
   a mechanism that adds power from the alternative source of power to power from the main source of power to form combined power when the power required by the at least one water delivery device and/or the at least one lighting element exceeds the power consumption threshold, and that delivers the combined power to the at least one water delivery device and/or the at least one lighting element; and
   a controller with software that controls the mechanism to deliver combined power at one or more predicted times during the performance based on predicted power consumption requirements of the performance, including predictions of when the power consumption threshold will be exceeded.

2. The water and/or light display of claim 1, wherein the alternative source of power is an energy storage device.

3. The water and/or light display of claim 2, wherein the energy storage device is a battery or a capacitor.

4. The water and/or light display of claim 1, wherein the power consumption threshold is exceeded multiple predicted times during the performance when the power consumption threshold will be exceeded.

5. The water and/or light display of claim 1, wherein the power consumption threshold is exceeded for all or substantially all of the performance.

6. The water and/or light display of claim 1,
   wherein the performance follows a choreography and the choreography includes times during the performance when multiple water delivery devices and multiple lighting elements are used requiring power consumption exceeding the power consumption threshold.

7. The water and/or light display of claim 1, wherein the controller controls the mechanism to deliver power from the main source of power to the alternative source of power to charge the alternative source of power, based on one or more predicted times during or before the performance when the power consumption threshold is not exceeded.

8. The water and/or light display of claim 7, wherein the main power source has a variable cost associated with it delivering power, and the charging occurs during a time of day when the cost is low.

9. The water and/or light display of claim 1, further comprising two or more alternative sources of power; wherein each of the two or more alternative sources of power are located in close proximity to the at least one water delivery device and/or at least one lighting element.

10. A water and light display that provides a performance, wherein the performance has a power consumption threshold that is exceeded at a predetermined time during the performance, the display, comprising:
    at least one water delivery device that consumes power;
    at least one lighting element that consumes power;
    a main source of power;
    an alternative source of power;
    a mechanism that adds power from the alternative source of power to power from the main source of power to form combined power when the power consumed by the at least one water delivery device and the at least one lighting element exceeds the power consumption threshold, and that delivers the combined power to the at least one water delivery device and the at least one lighting element; and
    a controller that controls the mechanism to form combined power and to deliver combined power at the predetermined time.

11. The water and light display of claim 10, wherein the alternative source of power is an energy storage device.

12. The water and light display of claim 11, wherein the energy storage device is a battery or a capacitor.

13. The water and light display of claim 10, wherein the controller controls the mechanism to deliver power from the main source of power to the alternative source of power to charge the alternative source of power at other than the predetermined time when the power consumed by the at least one water delivery device and the at least one lighting element is below the power consumption threshold.

14. The water and light display of claim 10, wherein the main power source has a variable cost associated with it delivering power, and the charging occurs during a time of day when the cost is low.

15. The water and light display of claim 10, comprising two or more alternative sources of power; wherein each of the two or more alternative sources of power are located in close proximity to at least one water delivery device and at least one lighting element.

16. A water and light display that provides a performance, wherein the performance has a power consumption threshold and the performance has a predetermined choreography involving different levels of power consumption during the performance, including a predetermined time when the power consumption threshold is exceeded, the display, comprising:
    at least one water delivery device that consumes power;
    at least one lighting element that consumes power;
    a main source of power;
    an alternative source of power that is a battery or a capacitor; and
    a mechanism that adds power from the alternative source of power to power from the main source of power to form combined power when the power consumed by the at least one water delivery device and the at least one lighting element exceeds the power consumption threshold based on the predetermined choreography;
    a controller that directs the mechanism to form combined power based on the choreography at the predetermined time when the power consumption threshold is exceeded.

17. The water and light display of claim 16, wherein the controller controls the mechanism to deliver power from the main source of power to the alternative source of power to charge the alternative source of power, at a time other than the predetermined time when the power consumption threshold is exceeded.

18. The water and light display of claim 16, wherein the main power source has a variable cost associated with it delivering power, and the charging occurs during a time of day when the cost is low.

19. The water and light display of claim 16, comprising two or more alternative sources of power; wherein each of the two or more alternative sources of power are located in close proximity to at least one water delivery device and at least one lighting element.

20. The water and light display of claim 19, wherein the controller directs the two or more alternative sources of power to deliver power to the at least one water delivery device and the at least one lighting element in close proximity.

\* \* \* \* \*